Patented Nov. 7, 1950

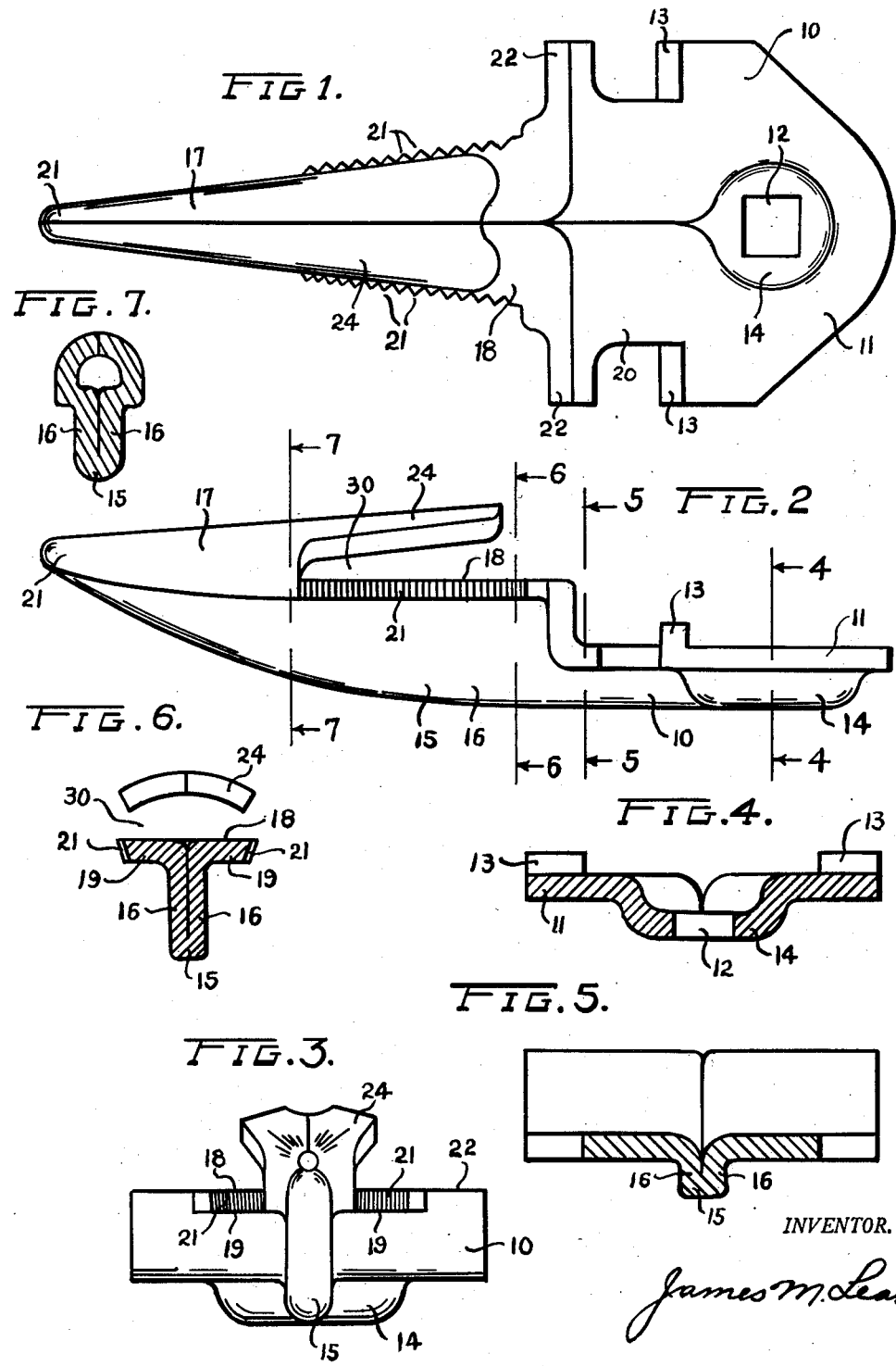

2,529,087

UNITED STATES PATENT OFFICE 2,529,087

MOWER GUARD

James M. Leake, Monroe, Mich.

Application April 2, 1947, Serial No. 738,962

2 Claims. (Cl. 56—310)

This invention relates to mower guards for reciprocating cutters of a mower, binder, harvester and other machines, and more particularly to mower guards made of sheet metal.

A great majority of the mower guards for the reciprocating knife of mowers and other similar machines are at the present time made from cast malleable iron with a steel ledger plate secured to the body of the mower guard to provide an efficient and durable cutting edge to cooperate with the reciprocating knife. These guards are made as light as is consistent with the strength requirements of a guard under normal operating conditions. Under exceptionally hard cutting conditions, such as are encountered in stony fields, the cast malleable mower guards often prove to be very unsatisfactory. Under these operating conditions the cast malleable mower guards bend or fracture. If the cast malleable mower guards do not fracture in the bending process, they do fracture when an attempt is made to straighten them.

In an attempt to overcome these objections, however, mower guards have been made from cast steel and drop forged steel. In many cases a multiplicity of drop forgings or castings or a combination of drop forgings and castings have been welded together to form a complete mower guard. An objection to such mower guard construction is that they are heavy and massive. Furthermore, the manufacturing process is complicated and the cost is much higher than the cost of an ordinary cast malleable mower guard due to the nature of the process of manufacture.

Another objection to the cast or forged steel is that due to its strength and rigidity, the steel mower guard has very little resiliency. When a stone or other rigid object is caught or wedged between the reciprocating knife and the mower guard, the cast steel mower guard usually fractures or breaks.

Further attempts have been made to make a mower guard from a plurality of stampings or from a combination of stampings and castings. These have been proven very unsatisfactory because the assembly process was expensive. Furthermore, they were made from a plurality of thin stampings, hence they do not have the required strength. They also have openings and hollow portions which collect dirt and moisture which in turn causes excessive corrosion. These hollow mower guards are of necessity made from a light gage sheet metal and are very resilient. Hence, they do not fracture readily, but they bend easily. When they are bent, it is impossible to straighten this type of mower guard because it is impossible to back the inner surface of hollow sections while straightening the mower guard and as a result the hollow mower guard kinks or buckles in the straightening process.

My improved mower guard disclosed in my co-pending application, Serial No. 650,231, now Patent No. 2,483,212, provides a one piece stamped mower guard that overcomes the above mentioned objections.

This improved mower guard employs the conventional ledger plate. My present invention provides a stamped metal mower that provides a mower guard and ledger plate in one piece.

One of the objects of my invention is to provide a stamped mower guard and ledger plate from a single piece of sheet metal.

Another object of my invention is to provide a stamped mower guard and ledger plate in a one piece construction that is light in weight and at the same time possesses the necessary degree of strength required.

Another object of my invention is to provide a one piece stamped mower guard and ledger plate combination that possesses such a degree of elasticity as will enable it to yield under impact and then spring back to its original shape and at the same time provide a hard durable edge on the ledger plate portion.

Another object of my invention is to provide a combined mower guard and ledger plate that eliminates hollow sections which tend to collect dirt and moisture which in turn causes rapid and excessive corrosion.

Another object of my invention is to provide a combined mower guard and ledger plate that can readily be restored to its original shape without fracturing, buckling, or kinking in case it is bent by exceptionally severe working conditions.

Another object of my invention is to provide a one piece stamped mower guard and ledger plate combination that does not require an assembly of a plurality of parts.

Another object of my invention is to provide a one piece stamped mower guard and ledger plate that is adapted to quantity production.

Another object of my invention is to provide a one piece stamped mower guard and ledger plate that provides an adequate wearing shoe.

Another object of my invention is to provide a combined mower guard and ledger plate in a unitary construction that is strong, durable and inexpensive.

Other objects and advantages of my invention will be apparent during the course of the following description.

In the drawings:

Fig. 1 is a top plan view of my improved mower guard ledger plate combination.

Fig. 2 is a side elevation of my improved mower guard ledger plate combination shown in Fig. 1.

Fig. 3 is a front or end view of my improved mower guard and ledger plate combination.

Fig. 4 is a sectional view taken along line 4—4 of Fig. 2.

Fig. 5 is a sectional view taken along line 5—5 of Fig. 2.

Fig. 6 is a sectional view taken along line 6—6 of Fig. 2.

Fig. 7 is a sectional view taken along line 7—7 of Fig. 2.

In the drawing, wherein for the purpose of illustration, is shown a preferred embodiment of my invention: The numeral 10 designates a stamped sheet metal mower guard and ledger plate, the rear portion of which is provided with an attaching portion 11 by means of which the mower guard may be attached to a mower guard bar (not shown). It will be seen that the attaching portion 11 is provided with an opening 12 for the reception of a fastening member which secures the attaching portion 11 to the mower guard bar. The aperture 12 is located in the dished portion 14.

Cutter bar lugs 13 are integral with and bent upwardly from the attaching portion 11. A shoe portion 15 is provided by folding back upon itself the blank from which the stamped mower guard is formed to provide the layers 16—16. The shoe portion 15 extends from the dished portion 14 forwardly to the pointed end 21 of the mower guard where the shoe 15 blends into the pointed end 21 of the mower guard.

The nose 17 of the mower guard 10 is provided by forming the front end of the mower guard into a substantially cone shaped portion. A substantially flat bed 18 is provided by the horizontal portions 19—19 extending at right angles from the shoe layers 16—16. The flat bed 18 is integral with and on the same level as the knife bar guides 22—22. The edges of the flat bed 18 may be provided with serrations 21. The flat bed 18 eliminates the ledger plate used in the conventional mower guard assembly. My co-pending application, Serial No. 650,231, now Patent No. 2,483,212, discloses such an arrangement that uses the conventional ledger plate.

An intermediate web portion 20 connects the attaching portion 11 to the knife bar guides 22—22.

A lip or knife guard portion 24 extends rearwardly from the nose portion 17 above the flat bed or ledger plate 18. A knife slot 30 is provided between the lip 24 and the flat bed or ledger plate 18.

In actual operation the reciprocating knives (not shown) operate in the slot 30 between the lip 24 and the flat bed or ledger plate 18. The edges of the bed 18 which are usually provided with the serrations 21 cooperate with the reciprocating knives to cut the hay, grain, grass or other plants to be cut.

From the foregoing description it will be noted that my improved mower guard comprises a single stamping. Furthermore, it will be noted that my improved mower guard embodies a flat bed portion which acts as a ledger plate. Hence my improved mower guard provides a mower guard and ledger plate in a one piece stamping. Since my improved mower guard is of a single piece construction, it does not require any assembly process. My improved mower guard is pressed or stamped from a single sheet metal blank of predetermined size and shape. In the stamping or process employed to produce my improved mower guard, the fibers of the sheet metal blank are not destroyed. Thus, the strength characteristics of the sheet metal blank are preserved.

My improved mower guard has a seam 31 along the upper portion of the nose 17 and the lip 24. This seam may be welded, but tests have shown that my improved mower guard is strong enough without welding this seam.

My novel mower guard is lighter in weight than the conventional cast or forged mower guard. Since a sizeable number of mower guards are used on one cutter bar, a considerable decrease in weight of one cutter bar assembly is provided by the use of my improved mower guard.

Laboratory tests have proven that my improved mower guard is stronger than the conventional cast or forged mower guard. Actual tests in the field have also proven my improved stamped mower guard stronger than the conventional cast or forged mower guard. In the field tests the various types of mower guards were assembled side by side on the same cutter bar. Furthermore, when my improved stamped mower guard was subjected to such extreme operating conditions that they bent, they could be repaired in the field by hammering them back into shape while the cast and forged mower guards fractured when they bent and broke upon being straightened.

It will futher be noted that my improved mower guard eliminates the ledger plate used with the conventional mower guard. In order to provide a hard and long wearing ledger plate portion the edges of the flat bed or ledger plate portion may be hardened. In case this edge is provided with the serrations 21, the serrated portion may be hardened. It is also possible to case harden or otherwise harden the outer surface of the entire mower guard 10 in order to provide better wearing qualities.

From the above description it will be apparent that my improved mower guard is strong, resilient and light in weight. My improved mower guard is of one piece construction and therefore requires no assembly in its manufacture. My improved mower guard embodies a ledger plate hence even eliminating the assembly of a ledger plate to the mower guard. My mower is interchangeable with the present cast or forged mower guard.

While I have described one form of my invention, I do not wish to be limited to the particular form shown and described as it will be apparent to those skilled in the art that many modifications of a single piece stamped mower guard may be made without parting from the scope of my invention.

Having thus described my invention, what I claim is:

1. A mower guard body member formed from a single metal blank, sheet of predetermined size and shape, said body member comprising upper and lower body portions; said upper body portion comprising an upper nose portion at the forward end thereof, and an upper lip portion extending rearwardly from said upper nose portion; said lower body portion comprising a lower nose portion at the forward end thereof, a substantially T-shaped mid-section extending rearwardly from said lower nose portion, and a dished portion near the rear of said body member; said lower nose portion and the vertical portion of said T-shaped mid-section being substantially solid by being formed from two vertical extending walls in vertical contacting relation, the opposite edges of the horizontal portion of said T-shaped mid-section provided with serrations, said horizontal portion of said T-shaped midsection forming a substantially solid base, said substantially solid base in conjunction with said serrations providing a ledger plate, a flat surface portion partially surrounding said dished portion, and the base of said dished portion provided with an opening through which a fastening member may be extended to secure said mower guard to the guard of a mower.

2. A mower guard body member formed from a single metal blank, sheet of predetermined size and shape, said body member comprising upper and lower body portions; said upper body portion comprising an upper nose portion at the forward end thereof, and an upper lip portion extending rearwardly from said upper nose portion; said lower body portion comprising a lower nose portion at the forward end thereof, a substantially T-shaped mid-section extending rearwardly from said lower nose portion, and a dished portion near the rear of said body member; said lower nose portion and the vertical portion of said T-shaped mid-section being substantially solid by being formed from two vertical extending walls in vertical contacting relation, the horizontal portion of said T-shaped mid-section forming a substantially solid base portion, the opposite sides of said substantially solid base portion provided with cutting edges thereby providing a ledger plate, a flat surface portion partially surrounding said dished portion, and the base of said dished portion provided with an opening, through which a fastening member may be extended to secure said mower guard to the guard of a mower.

JAMES M. LEAKE.

REFERENCES CITED

The following references are of record in the file of this patent:

UNITED STATES PATENTS

| Number | Name | Date |
|---|---|---|
| 105,311 | Crosby | July 12, 1870 |
| 2,431,509 | Ronfeldt | Nov. 25, 1947 |

FOREIGN PATENTS

| Number | Country | Date |
|---|---|---|
| 2,251 of 1906 | Great Britain | Mar. 22, 1906 |